(12) United States Patent
Glasson et al.

(10) Patent No.: US 12,418,092 B2
(45) Date of Patent: Sep. 16, 2025

(54) REMOTE SENSING DEVICE

(71) Applicant: HYNDS LIMITED, Auckland (NZ)

(72) Inventors: Neil David Glasson, Christchurch (NZ); Craig David Shannon, Auckland (NZ); John Henry Meerabux, Carindale (AU); Aaron Hynds, Auckland (NZ)

(73) Assignee: HYNDS LIMITED, Auckland (NZ)

( * ) Notice: Subject to any disclaimer, the term of this patent is extended or adjusted under 35 U.S.C. 154(b) by 106 days.

(21) Appl. No.: 18/245,949

(22) PCT Filed: Sep. 24, 2021

(86) PCT No.: PCT/IB2021/058709
§ 371 (c)(1),
(2) Date: Mar. 20, 2023

(87) PCT Pub. No.: WO2022/064432
PCT Pub. Date: Mar. 31, 2022

(65) Prior Publication Data
US 2023/0344111 A1 Oct. 26, 2023

(30) Foreign Application Priority Data
Sep. 24, 2020 (NZ) ........................ 768306

(51) Int. Cl.
*H01Q 1/22* (2006.01)
*E02D 29/14* (2006.01)
*G01F 23/292* (2006.01)

(52) U.S. Cl.
CPC ............. *H01Q 1/225* (2013.01); *E02D 29/14* (2013.01); *G01F 23/2927* (2013.01); *E02D 2600/10* (2013.01)

(58) Field of Classification Search
CPC ........ H01Q 1/225; H01Q 1/04; H01Q 1/2233; H01Q 1/1214; H01Q 19/06; E02D 29/14;
(Continued)

(56) References Cited

U.S. PATENT DOCUMENTS 9,170,127 B2 * 10/2015 Cook ..................... H01Q 1/12
9,961,418 B2   5/2018 Rodriguez, Jr. et al.
10,388,844 B2  8/2019 Kurihara et al.

FOREIGN PATENT DOCUMENTS

CN        205348231 U   6/2016
EP          1867791 B1  12/2007
(Continued)

*Primary Examiner* — David Z Huang
(74) *Attorney, Agent, or Firm* — Niels Haun; Dann, Dorfman, Herrell & Skillman, P.C.

(57) ABSTRACT

A remote sensing system and device is provided for monitoring a condition within an infrastructure network. In particular, the system and device are configured to monitor components of civil water infrastructure such as sewers, rainwater infrastructure, freshwater infrastructure, manholes, catch pits, sewers, or outlets etc. The device includes an antenna unit having an elongate hollow shaft depending therefrom, and a monitoring unit for housing electrical components including a sensor for detecting a parameter. The monitoring unit is removably mounted to the antenna unit via the shaft, and connected to a component of the infrastructure being monitored, for example manhole cover or lid. The antenna unit and monitoring unit are separate and individually water-tight structures, and the elongate hollow connection shaft makes an essentially rigid connection, while finding a passageway between antenna unit and monitoring unit.

20 Claims, 11 Drawing Sheets

(58) Field of Classification Search
CPC ... E02D 2600/10; G01F 23/2927; H04Q 9/02;
B65D 90/10; G01S 13/88; H05K 5/06
See application file for complete search history.

(56) References Cited

FOREIGN PATENT DOCUMENTS

| | | |
|---|---|---|
| JP | 2016115577 A | 1/2016 |
| KR | 101344821 B1 | 12/2013 |
| KR | 101597723 B1 | 2/2016 |
| KR | 101880472 B1 | 10/2017 |
| WO | WO-2016024352 A1 * | 2/2016 ............. G01D 11/30 |
| WO | WO-2017074205 A1 * | 5/2017 ......... E02D 29/1427 |
| WO | 2019122889 A1 | 6/2019 |

* cited by examiner

1

REMOTE SENSING DEVICE

FIELD OF THE INVENTION

The present invention relates to a remote sensing device for monitoring a condition in water infrastructures such as manholes, sewers, stormwater catch pits, rain gardens, water troughs, gross pollutant traps, waste tanks, etc. More particularly, one preferred configuration relates to a remote sensing device for a smart manhole cover including one or more sensors integrated with the manhole cover.

BACKGROUND OF THE INVENTION

A manhole cover is a removable lid covering an opening of a manhole. Removing the manhole cover can provide access into the manhole. Access into manholes may be necessary for maintenance and servicing of underground infrastructure and facilities.

Monitoring parameters associated with the manhole such as water level, the presence of gas, gas concentration, temperature etc. may be useful. Traditionally, it has been necessary for operators to remove the manhole cover and enter the manhole to monitor or take measurements as required.

However, manhole covers are typically made from a heavy, solid material such as concrete, or cast metals. Removing the manhole covers and monitoring the manholes may therefore be difficult and may lead to injury to operators. Furthermore, entering into manholes may be dangerous due to exposure to toxic substances (e.g. H2S gas), or entering the manhole may create a fall hazard.

It may therefore be desirable to obtain information associated with a manhole, manhole cover or other water infrastructure as required remotely i.e. without going to the manhole or to other monitoring location, removing the manhole cover and accessing the manhole. It may also be desirable to provide a robust and durable smart manhole cover, suitable for use in its harsh and wet environment.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

It is an object of the present invention to provide a remote sensing device which overcomes or at least partially ameliorates some of the abovementioned disadvantages or which at least provides the public with a useful choice.

It is another object of the present invention to provide a smart manhole cover which overcomes or at least partially ameliorates some of the abovementioned disadvantages or which at least provides the public with a useful choice.

BRIEF DESCRIPTION OF THE INVENTION

According to a first aspect the invention broadly comprises a remote sensing device for monitoring a condition within an infrastructure network comprising:

an antenna unit having an elongate hollow shaft depending therefrom, a monitoring unit for housing electrical components including a sensor for detecting a parameter, the monitoring unit removably mounted to the antenna unit via the shaft, wherein the antenna unit and monitoring unit are separate and individually water-tight structures; and wherein the elongate hollow connection shaft makes an essentially rigid connection to a component of the infrastructure being monitored.

According to another aspect the hollow connection shaft comprises an external thread for making the essentially rigid connection.

According to another aspect one of the securing elements is a nut associated with the threaded hollow connection shaft, the nut having large engaging surface for engaging against the component of infrastructure to form the essentially rigid connection.

According to another aspect the nut indirectly engages the component and the device includes one or more washers or gaskets.

According to another aspect the hollow connection shaft is connected directly to the component of infrastructure to form the essentially rigid connection.

According to another aspect an external thread of the hollow connection shaft engages directly with the component of infrastructure.

According to another aspect the hollow connection shaft is welded to the component of infrastructure.

According to another aspect the hollow connection shaft receives a cable connection.

According to another aspect an electrical connection is formed between the antenna unit and monitoring unit at the same time as a mechanical connection between the units is established with one motion.

According to another aspect the electrical connection is a push type electrical connector incorporated with the hollow elongate shaft.

According to another aspect the monitoring unit comprises a hub for mounting to the elongate shaft, and the hub includes an opening for receiving the hollow connection shaft to pass through and form the connection.

According to another aspect the monitoring unit is located in a region between the top and bottom ends of the hollow connection shaft.

According to another aspect the electrical components are located in a cavity of the monitoring unit, arranged to be spaced radially around the hub.

According to another aspect the monitoring unit comprises one or more drain ports located on the hub for water to pass through the monitoring unit, without entering the cavity housing the electrical components.

According to another aspect in plan view, the monitoring unit comprises one of the following general housing profiles:
 a) donut,
 b) ring,
 c) partial-ring,
 d) horseshoe.

According to another aspect the sensor is one of the following:
 a) water level sensor,
 b) non-contact flow sensor,
 c) gas sensor,
 d) temperature sensor,
 e) moisture sensor,
 f) tamper sensor, g) vibration sensor, or h) light sensor.

According to another aspect the sensor is a radar sensor comprising a lens.

According to another aspect the lens is integrated with a housing of the monitoring unit.

According to another aspect the monitoring unit comprises a water rejecting region in a focal area of the lens.

According to another aspect the water rejecting region is a ramp on a housing surface of the monitoring unit for draining water downwards away from the focal area.

According to another aspect the electrical components housed in the monitoring unit comprises one or a combination of:

a) a controller, b) a wireless communication module, c) a power supply.

According to another aspect all the electrical components are housed within one monitoring unit.

According to another aspect the antenna unit comprises a flat base for engaging with a flat surface of the component of infrastructure.

According to another aspect the antenna unit has a trafficable shape such as a dome shape.

According to another aspect the monitoring unit comprises an upper housing portion and a lower housing portion, the upper housing portion comprises downwards facing shell profile and the lower housing portion comprises a substantially flat lid profile.

According to another aspect a single gasket is provided between the upper housing portion and the lower housing portion to seal a mating surface between the housing portions.

According to another aspect the invention broadly comprises a smart manhole cover comprising:

a manhole cover body; and a remote sensing device as described in the previous clauses;

wherein the remote sensing device is connected to the manhole cover body such that the antenna unit is located at an upper surface of the manhole cover body and the monitoring unit is located on an underside of the manhole cover body.

According to another aspect the elongate shaft passes through a through-hole of the manhole cover body for a connection between the antenna unit and monitoring unit.

According to another aspect the hollow connection shaft extends along a longitudinal connection axis passing through the through-hole.

According to another aspect the manhole cover body comprises a cavity on the underside of the cover for receiving the monitoring unit and the monitoring unit has a height less than the cavity height such that the monitoring unit does not protrude below a bottom surface of the manhole cover body.

According to another aspect the connection comprises one or a combination of the following connection types:

a) fasteners, b) threaded, c) snap-on, d) twist-fit, e) bayonet mount.

According to another aspect the connection comprises a double fastener stack including a primary fastener for first connecting the antenna unit to the manhole cover body and a secondary fastener for connecting the monitoring unit.

According to another aspect the invention broadly comprises a method of sensing a parameter comprising:

providing a remote sensing device as described in any of the previous clauses;

monitoring a parameter;

wirelessly communicating data from the remote sensing device to a remote receiver.

According to another aspect the method further comprises passing the hollow connection shaft through an opening of the monitoring unit and securing the monitoring unit with a hub fastener tightened against a surface of the monitoring unit.

According to another aspect the parameter is associated with a manhole and the remote sensing device is connected to a manhole cover body to form a smart manhole cover.

According to another aspect the hollow connection shaft connects the antenna unit and the monitoring unit on opposite sides of the manhole cover body.

According to another aspect the method further comprises securing the antenna unit to the manhole cover body before securing the monitoring unit.

According to another aspect the method further comprises positioning the monitoring unit onto the hollow connection shaft on the underside of the manhole cover body and securing the monitoring unit toward and/or against a bottom surface of the cover.

According to another aspect the monitoring unit is clamped between the manhole cover body and a nut.

According to another aspect the method further comprises rotating one or both of the antenna unit and the monitoring unit to their operating position before securing the units in position.

According to another aspect the antenna unit is secured to the manhole cover body before the monitoring unit is secured to the manhole cover body.

According to another aspect the remote sensing device is retrofitted to an existing manhole cover body.

According to another aspect the remote sensing device is connected to the manhole cover body during manufacture.

According to another aspect the remote sensing device is associated with and connected to one of the following:

a) sewers, b) stormwater catch pits, c) rain gardens, d) water troughs, e) gross pollutant traps, f) waste tanks.

BRIEF DESCRIPTION OF THE DRAWINGS

The invention will now be described by way of example only and with reference to the drawings in which.

DETAILED DESCRIPTION OF PREFERRED EMBODIMENTS

The present invention is a remote sensing device 100 for monitoring a condition within a water infrastructure network as illustrated in FIGS. 1 to 16. In the preferred configurations, the remote sensing device 100 is for a manhole cover for covering an opening of a manhole. The remote sensing device 100 is configured to monitor manholes or other water infrastructure where suitable with no or minor modification to the described invention (e.g. sewers, stormwater catch pits, rain gardens, water troughs, gross pollutant traps, waste tanks etc.) and wirelessly communicate data to a remote receiver.

Generally, water infrastructure like manholes are harsh and wet environments. The remote sensing device 100 has delicate components to achieve certain performance requirements (e.g. good signal transmission, sensor able to obtain good readings). Preferably, the present invention can provide a simple, repeatable and robust way of mounting these delicate components to a manhole cover while also protecting the components against the harsh and wet environment it is installed in.

A manhole cover is often placed on and/or dragged across the ground during installation. Consequently, any components protruding out the underside of the manhole may be easily damaged. It may therefore be desirable to provide a low-profile device and protect components on the underside of the device. Specific components in the device, structures and arrangements are described below to provide the desired performance capabilities, while also providing a durable and robust device.

Furthermore, water infrastructure/manhole covers can have different profiles (e.g. different cavity and/or rib configurations on the underside of the manhole cover) or are formed from different material (cast iron, metal, composites, plastic, concrete etc.). Repeatable and flexible installation on different structures may be desirable so that the device can be installed onto a wide of range of different cover profiles. Installing the remote sensing device 100 to traditional infrastructure can quickly convert the structure to 'smart' infrastructure with monitoring and communication capabilities. The remote sensing device 100 of the present invention provides structures which can be simply installed onto different water infrastructure/manhole covers with different profiles with no or limited modification to the cover. The remote sensing device 100 may also be simply removed for replacing, upgrading and/or maintaining components as required.

The general structure of the various configurations of the remote sensing device 100 and method of sensing a parameter using the device as shown in the figures will now be described.

It will be appreciated that these figures illustrate the general principles of construction, and that the invention is not limited to the precise mechanical configurations illustrated.

Device Components

Figure 1:
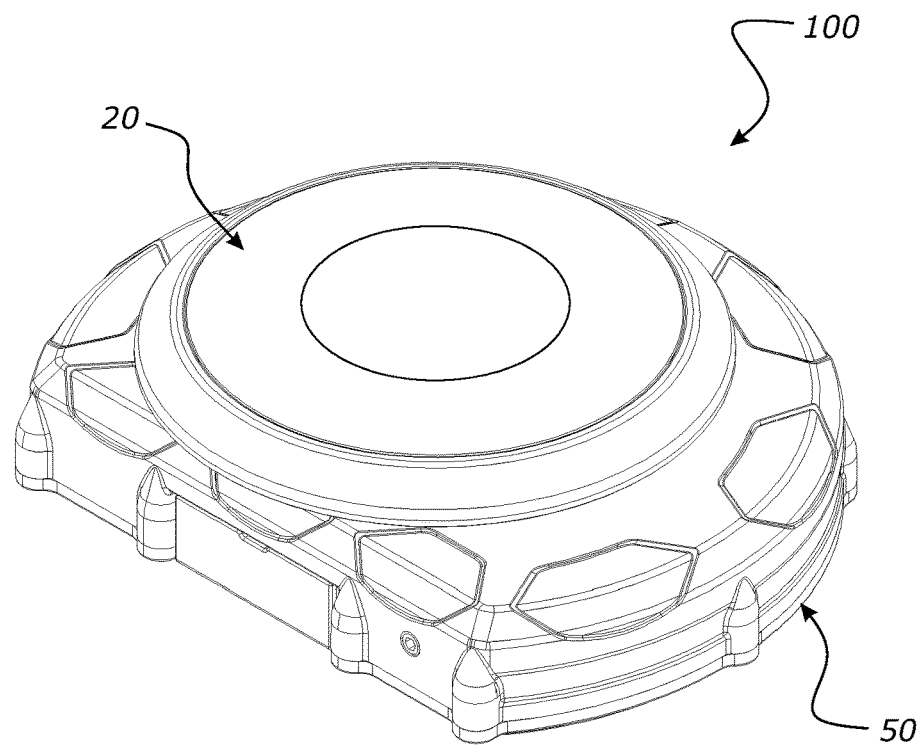
FIG. 1 shows a top perspective view of a remote sensing device.

As shown in FIG. 1, there is a remote sensing device 100. The remote sensing device 100 comprises an antenna unit 20 and a monitoring unit 50, removably mounted to the antenna unit, for housing electrical components.

Preferably, the antenna unit 20 and the monitoring unit 50 are separable and individually water-tight structures. The individually water-tight units allow the structures to be separated and easily installed onto the infrastructure it is monitoring from.

The antenna unit 20 is a structure which carries an antenna (i.e. an antenna is embedded in the antenna unit 20 structure). The antenna is configured to send or receive a signal to a remote receiver outside the manhole/from the monitored infrastructure.

Preferably, the antenna unit 20 comprises a flat profile with a relatively large surface area for improved signal.

Preferably, the antenna unit 20 is located on an upper region and/or outside a manhole/infrastructure being monitored (i.e. on top of a manhole cover), for improved signal transmission.

In the preferred configurations, an antenna wire is moulded or otherwise embedded into the antenna unit 20 (e.g. an antenna patch embedded in the antenna unit).

The antenna unit 20 is exposed on the top surface of the manhole cover and therefore exposed to impact from traffic and may be subject to harsh and wet conditions. In some configurations, the antenna patch is embedded in a solid or substantially solid housing (potting to make a solid or near solid unit). A solid and robust antenna unit 20 structure can reduce potential leak pathways which can damage the internal antenna and/or reduce performance issues or damage due to impact/vibrations due to vehicles passing over the manhole cover.

In the preferred configurations, the antenna unit 20 is an independently watertight structure from the monitoring unit 50, for housing and protecting the antenna (i.e. the antenna unit 20 is watertight even when it is not connected to the monitoring unit 50). The units are preferably watertight, to protect against the harsh environment it is in (e.g. where liquids and/or dangerous gases are present). A watertight housing may be understood to be a protective housing to limit or prevent gas/liquid immersion into the internal cavity of the unit which houses the antenna/electrical components.

In the preferred configurations, the materials and/or components incorporated in the remote sensing device 100 is rated for potentially explosive environments. For example, the materials and/or components are adapted to prevent minimise likelihood of fire or explosion hazards when potentially in contact with combustible or flammable gases, vapours etc. The housing and structure of the device is preferably suitably airtight to reduce the potential entrance of dangerous gases.

The monitoring unit 50 houses electrical components such as one or more sensors 30, a controller 32, a wireless communication module 31 (i.e. driving the transmitting and receiving protocol via the antenna), and/or power supply 33 (e.g. battery).

In the preferred configurations, the monitoring unit 50 is an independently watertight structure from the antenna 20, for housing and protecting the electrical components (i.e. the monitoring unit 50 is watertight even when it is not connected to the antenna unit 20).

It should be appreciated that by having the electrical components housed within the monitoring unit 50, wires or protuberances outside the housing are eliminated or at least reduced. Consequently, the monitoring unit 50 can provide protection to the components it houses, in the harsh environment of a manhole and/or during transportation, installation and removal of the manhole cover.

Figure 10:
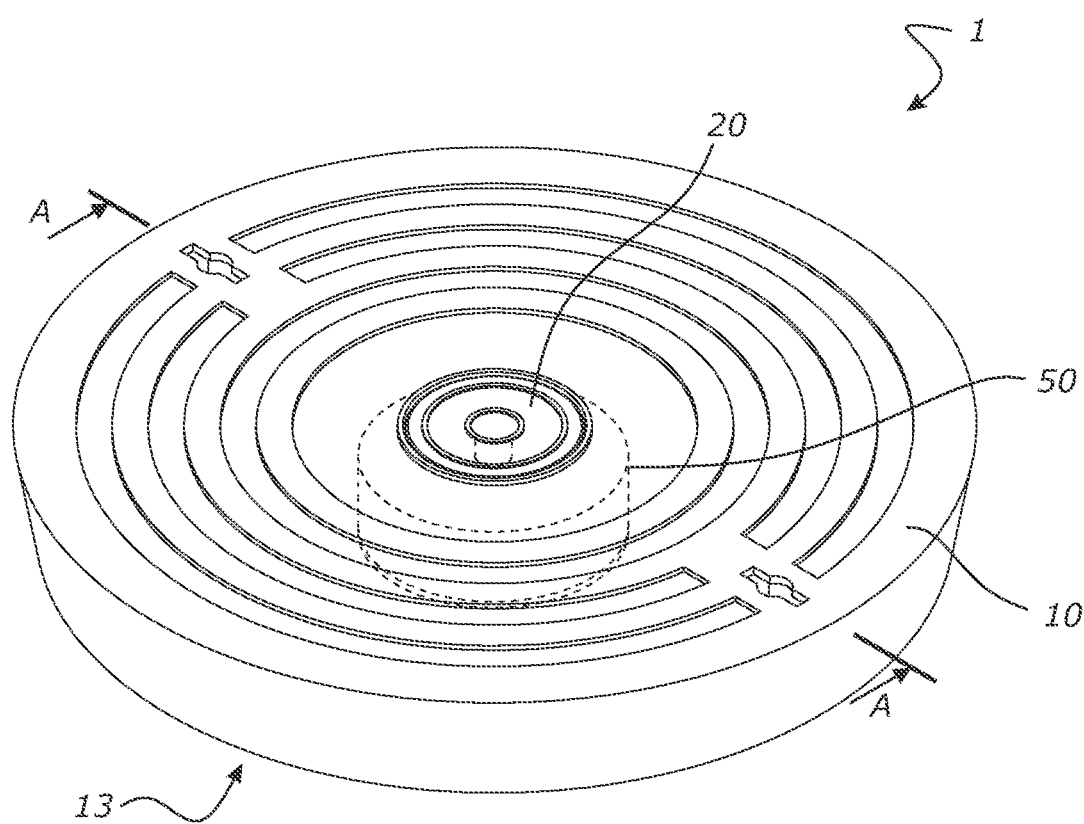
FIG. 10 shows a top perspective view of a smart manhole cover.
Figure 11:
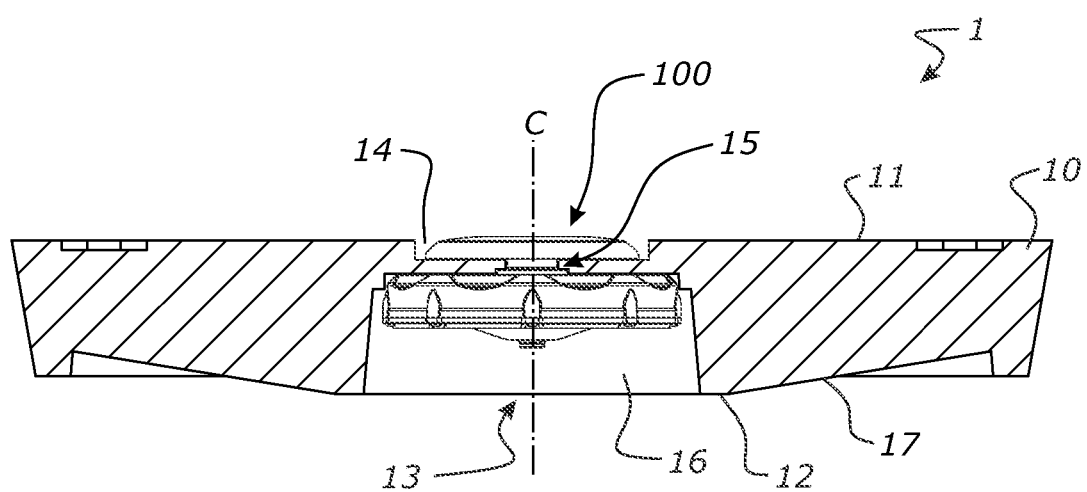
FIG. 11 shows a side view of the smart manhole cover.

In the preferred configuration, the remote sensing device 100 is installed/connected to a manhole cover body 10 to form a smart manhole cover 1, as shown in FIGS. 10 and 11. Simply connected the remote sensing device 100 can transform a traditional manhole cover to a smart manhole cover 1 with monitoring and wireless communication capabilities.

The smart manhole cover 1 comprises a manhole cover body 10 for covering an opening of a manhole. In some configurations, the cover body 10 is an existing manhole cover and the remote sensing device 100 for monitoring and/or communication information from the manhole can be simply and easily retrofitted to the existing manhole cover body. In other configurations, the components are connected to a cover body 10 during manufacturing of the smart manhole cover 1.

Preferably, once the remote sensing device 100 is rigidly connected to the manhole cover and the device is incorporated with/into the manhole cover, it becomes part of the manhole cover.

Preferably the remote sensing device 100 is integrated with a manhole cover body 10. Where the device is integrated with the cover body 10, it should be understood as being connected to the cover such that it becomes part of the cover and will move with the cover (e.g. as the cover is removed or placed over the manhole). Preferably, integrated with the cover body can be understood to mean that the device is located on the manhole cover and/or secured to the manhole cover so that it remains on the manhole cover upon impact on the cover and when it is moved (e.g. dragged into position). The remote sensing device 100 can be integrated/connected with the cover body 10 by direct or indirect coupling.

It should be appreciated, in these preferred configurations where the device is integrated with the manhole cover, the components for monitoring and communicating information to/from the manhole is on/within the lid. Therefore, an operator does not need to enter the manhole to take measurements or enter the manhole to install the sensor down into the manhole (improving safety of installation). A smart manhole cover 1 may be simply manufactured and put in place at the manhole site. Alternatively, the smart manhole cover 1 may be simply formed on the side of a road by connecting the remote sensing device 100 to an existing manhole cover with no or minor modifications (e.g. forming a through-hole 15) to the cover to form the smart manhole cover.

Further, installation/connection of the components to the manhole cover or other infrastructure is simplified as the units as a whole is connected to the cover rather than individual components. Simplifying the installation process of components to the manhole cover reduces time and costs of forming the smart manhole cover, whether it be by retrofitting the components to an existing manhole cover or manufacturing a smart manhole cover. Simplifying the installation process also reduces the skill level/expertise required to install the remote sensing device on-site (e.g. when retrofitting to an existing cover) or during manufacture.

Figure 16:
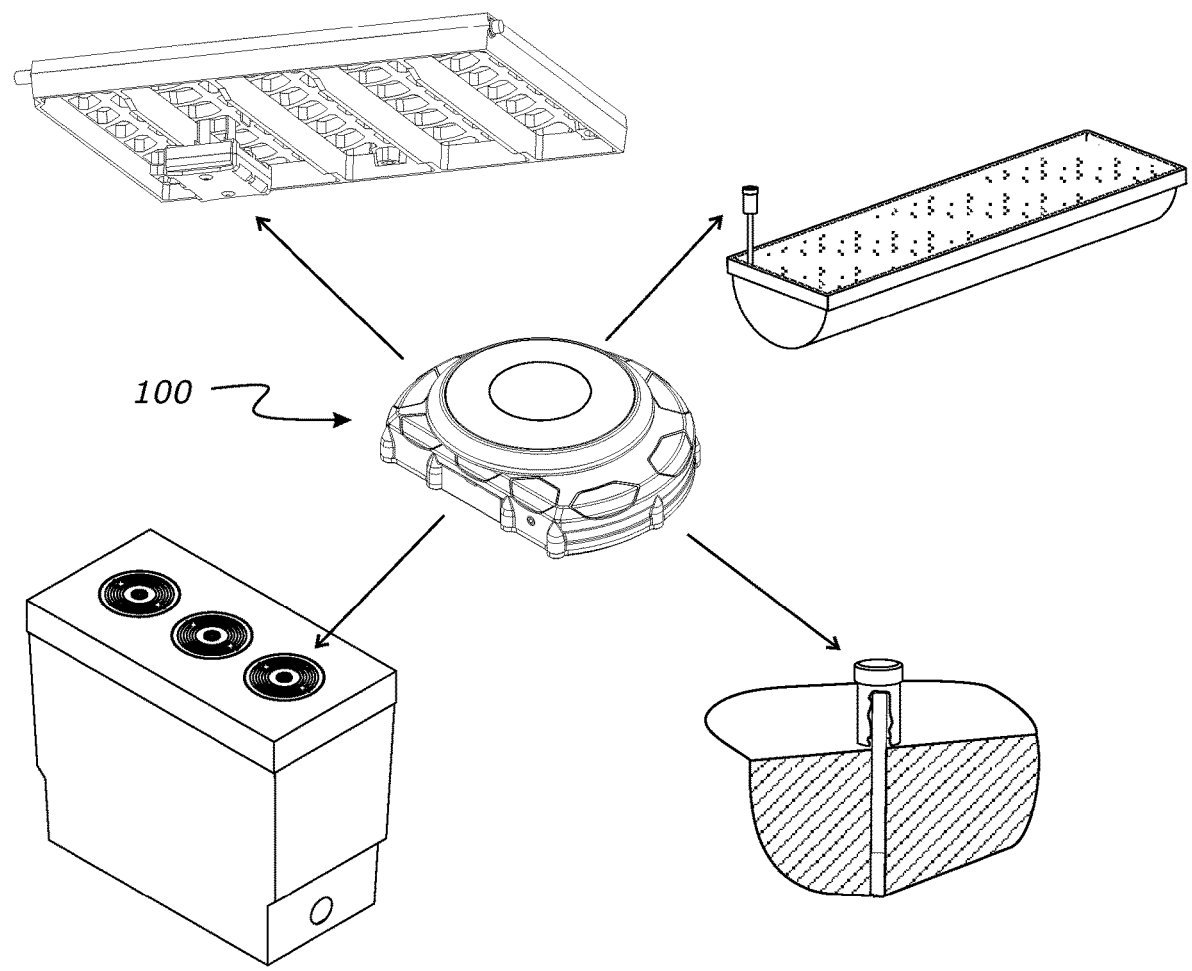
FIG. 16 shows the remote sensing device installed in different applications.

In other configurations, the remote sensing device 100 is secured using any suitable method to different infrastructure such as a catch pit as shown in FIG. 16. The device 100 is secured to the catch pit grate, to monitor parameters e.g. water level below the catch pit.

In another configuration, the remote sensing device 100 is incorporated in a smart rain garden system (as shown in FIG. 16), to measure parameters such as moisture in different media levels in a rain garden. The device 100 can be secured to a structure, such as a pipe inserted into the rain garden media.

In another configuration, the remote sensing device 100 is incorporated into a smart trough system (as shown in FIG. 16), to measure water level inside a water trough. The device 100 can be secured to a structure, such as a pipe or post located above the water level of the trough.

In yet configuration, the remote sensing device 100 is incorporated into a tank (e.g. a waste tank) (as shown in FIG. 16), to measure water level inside. The device 100 can be secured to a structure, such as on the cover or upper surface of the tank.

In some configurations, all the electrical components (e.g. sensor 30, the controller 32, the wireless communication module 31, and the power supply 33) are housed within one monitoring unit 50. In other configurations one or more monitoring units 50 house the electrical components.

The antenna unit 20 and monitoring unit 50 each provides a water-tight housing for the antenna or the other electrical components. The units 20, 50 are watertight such that the housing/structure protects the internal components from water damage. Preferably, each structure/unit 20, 50 is hermetically sealed and/or includes sealing features (e.g. gaskets) to eliminate or at least reduce potential leak pathways into the internal components.

It should be appreciated separate structures for the antenna unit 20 and the monitoring unit 50 can provide advantages as they can be simply installed on different manhole covers (e.g. with different cavity and rib configurations on the underside of the cover).

Further, the antenna and monitoring units 20, 50 can installed on opposite sides of a manhole cover 10 and removed for individual maintenance or replacement as required. For example, the antenna unit 20 may be replaced to accommodate different wireless transmission technologies and/or frequency depending on the type of radio communication technology used. Monitoring units 50 with different functionality may be provided as required to the water infrastructure.

Further, the antenna unit 20 can be located at an upper surface 11 of the manhole cover to send or receive a good signal outside the manhole (improved signal propagation as the antenna is located on top of the manhole cover). The monitoring unit 50 can be located on an underside 13 of the manhole cover so that sensor 30 is within or at least located towards the inside of the manhole to detect a parameter or condition within the manhole and the electrical components are protected from the elements above ground.

Preferably, the antenna unit 20 is located at or towards the top surface 11 of the cover body 10 (for signal transmission).

In one configuration, the antenna unit 20 is located in a recess 14 on the top surface of the cover body as shown in FIG. 11. In these configurations a top surface of the antenna unit 20 is on the same plane or below the top surface 11 of the cover body 10. Preferably, the recess 14 is suitable for trafficability over the manhole cover. For example, the recess 14 preferably has a depth equal or less to 13 mm.

In another configuration, the antenna unit 20 is located on a top surface 11 of the cover body 10 without a recess 14.

In these configurations, the low profile of the antenna unit 20 is sufficient to not protrude too far above the manhole cover 10 as illustrated in FIG. 10.

Figure 6:
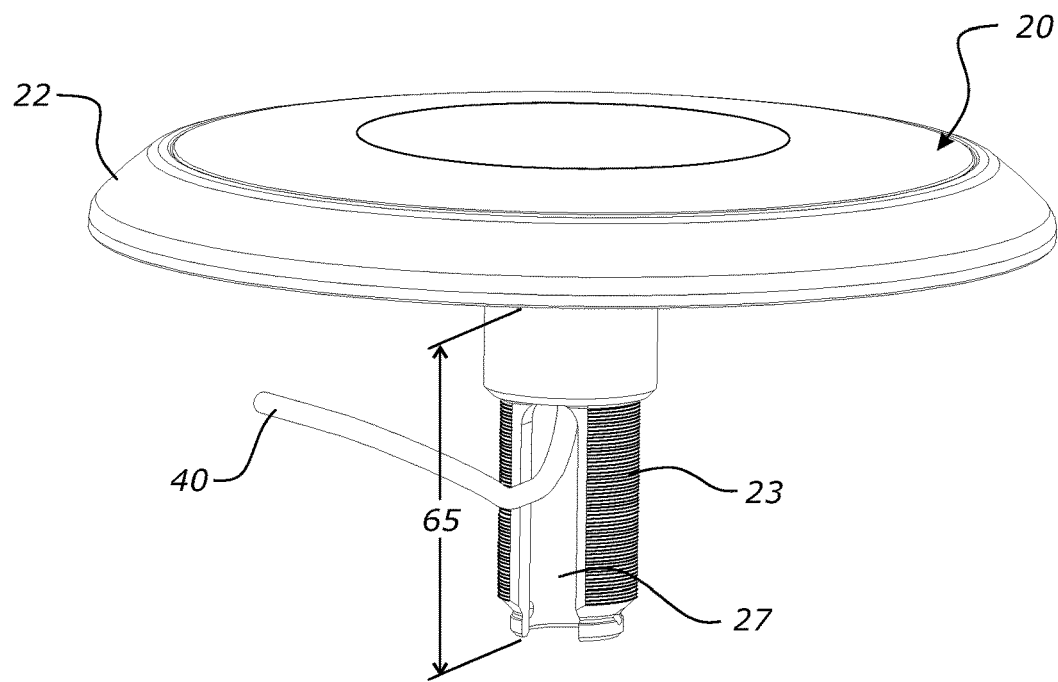
FIG. 6 shows a perspective view of an antenna unit and hollow connection shaft.

The antenna unit 20 comprises a flat base 22 for receiving the antenna. In some configurations, the antenna unit 20 has a trafficable shape (for pedestrians and vehicles to pass overhead without damaging the antenna unit) e.g. a dome shape as best shown in FIG. 6. Preferably, a top perimeter of the antenna tapers downwards (e.g. towards the bottom of the manhole cover as best shown in FIG. 11).

It should be appreciated, the recessed or low-profile of the antenna unit 20 can provide advantages such as reducing the risk of the device becoming a hazard for pedestrians or vehicles passing over the smart manhole cover and also minimises damage to the components of the smart manhole cover due to potential shear forces or vibrations passing through to the device.

Compact Cover

In the preferred configurations, the components of the smart manhole cover 1 are arranged to form a compact/low-profile cover. Preferably any protrusion above and below the manhole cover is minimised or eliminated (i.e. minimal protrusion above or below the top surface 11 and bottom surface 12 of the cover body 10).

A typical manhole cover has limited space on the underside of the cover (due to a limited cavity height 16 and obstructions e.g. ribs 17). Specific structures and arrangements of the structures of the present invention uses the limited space efficiently so that the device is compact/low-profiled, rigidly secured to the cover while providing the desired monitoring/communication performance requirements.

In configurations where protrusion of the remote sensing device 100 above the plane of the top surface 11 of the cover body 10 is minimised, the manhole cover can provide the advantage of reducing the likelihood of being a hazard to vehicles and/or pedestrians above the cover and damage to the antenna.

The manhole cover body 10 comprises a cavity 16 on the underside 13 of the cover to receive the monitoring unit 50 as referenced in FIG. 11.

In configurations where protrusion of the remote sensing device 100 below the plane of the bottom surface 12 of the cover body 10 is minimised or eliminated, operators may move, drag or place the manhole cover 1 on the ground without damaging the components/unit 50 on the underside 13 of the cover body 10. The bottom surface 12 (e.g. ribs 17) of the cover body 10 would contact the ground rather than components of the manhole cover 1. This can improve the longevity of the components connected to the manhole cover, minimising costs associated with maintenance and replacement of components.

Preferably, the monitoring unit 50 has a height less than the height of the manhole cover body 10/cavity 16 so that the remote sensing device 100 does not protrude below the bottom surface 12 of the cover body 12.

In other configurations, the lowest region of the smart manhole cover 1 is a support element extending from the remote sensing device 10 (e.g. a shaft/nut extending from the antenna unit 20) to contact the ground. In these configurations, the manhole cover rests on an edge of the cover and the extending support element so that the monitoring unit housing 51 does not contact the ground and damage to the components may be minimised.

To achieve a low-profile cover, particular components are provided in the remote sensing device 100 and are arranged and connected to the manhole cover 10 in specific configurations as described in more detail below.

Main Connection

In the preferred configurations, the remote sensing device 100 comprises a connection 21 configured to provide a rigid, stable and strong connection to secure/mount the device to the manhole cover body 10 or infrastructure (so that that the device becomes part of the manhole cover or other structure). It should be appreciated a strong connection can improve the lifespan and/or performance of the components of the remote sensing device 100. By providing a strong and rigid connection between the antenna and monitoring units 20, 50 and the manhole cover 10, loosening/movement of the components from its operating position, (or other damage) from vibrations/shear forces due to vehicles and pedestrians passing over the manhole cover may be minimised. A robust and reliable connection is desirable given the potential high forces (especially due to heavy vehicles, including airplanes) and frequency of traffic (high instantaneous and/or cyclic loads due to frequent traffic can loosen or break components/the housing) of the remote sensing device 100.

In the preferred configurations, the connection of the device 100 is simple, requiring no or limited modification to traditional manhole covers.

Preferably, the remote sensing device 100 is simply connected to a manhole cover body by inserting a hollow elongate shaft 23 depending from the antenna unit 20 through a through-hole 15 in the manhole cover and securing the antenna unit to the cover body (e.g. with a large fastener or other securing techniques discussed below).

Preferably, the hollow elongate shaft 23 makes an essentially rigid connection to a component of the infrastructure being monitored (e.g. connected to manhole cover lid). The connection is essentially rigid such that the device is sufficiently connected to a component/structure of the monitored infrastructure network and operate for a desired time. Once installed through the manhole cover the elongate shaft 23 provides a mounting structure on the underside 13 of the manhole cover for receiving and supporting the monitoring unit 50 and/or other structures and units on the underside of the manhole, to provide the desired functionality for the remote sensing device 100.

It should be appreciated that once the connection has been established (i.e. inserting the elongate shaft 23 through the manhole cover and securing the antenna unit 20), the traditional manhole cover is ready to receive the monitoring unit 50 and has been converted to a smart manhole cover 1 with monitoring/wireless communication capabilities.

Figure 12:
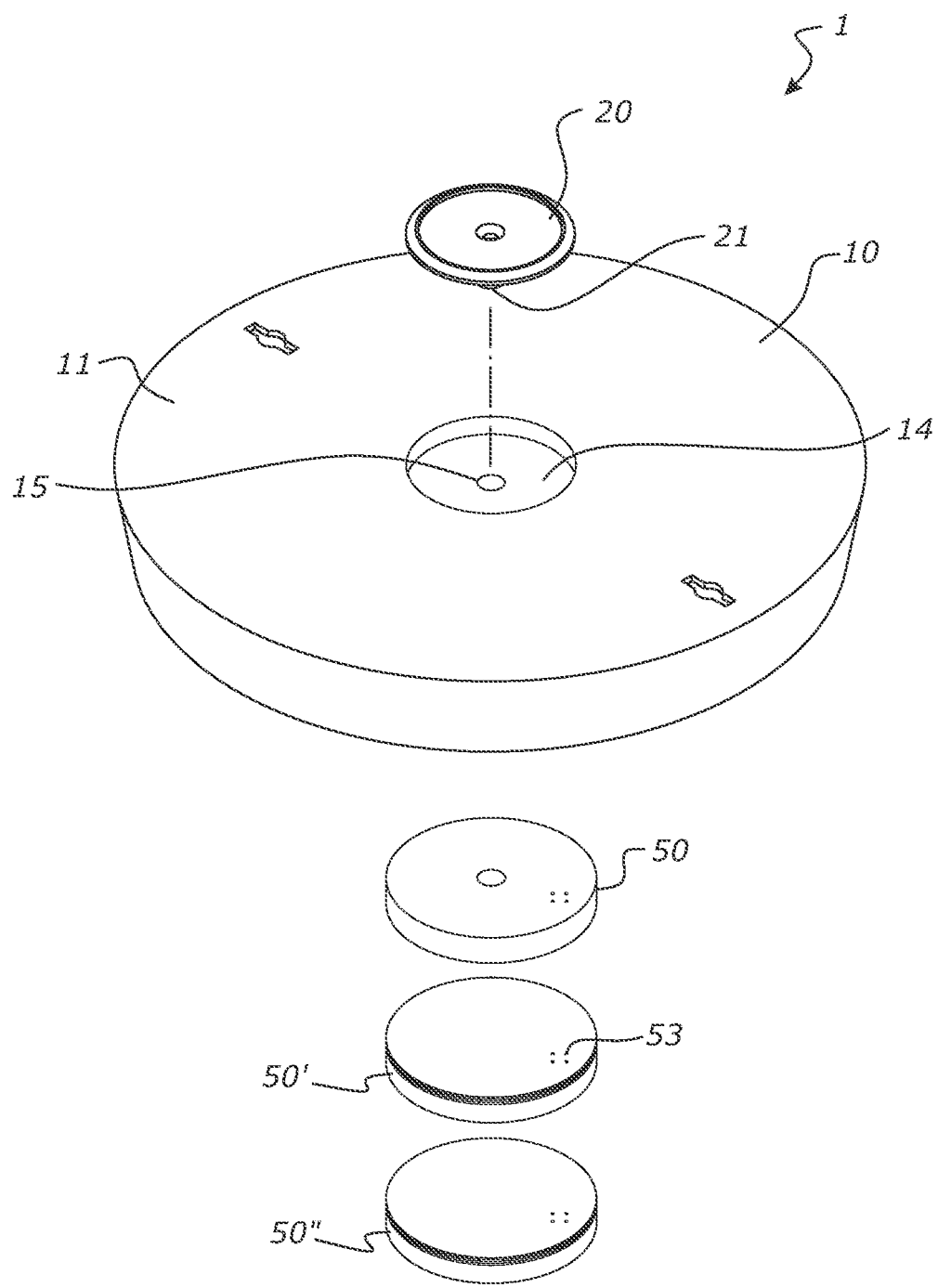
FIG. 12 shows an exploded view of a smart manhole cover with a plurality of modular units.

In some configurations, the manhole cover comprises an existing through-hole 15 passing through a top and bottom surface 11, 12 of the cover body 10 (referenced in FIGS. 11 and 12). In other configurations, through-hole 15 can be easily created (either on-site or off-site) to allow the connection 21 to passes through the manhole cover.

It is anticipated the remote sensing device 100 with a separable antenna unit 20 and monitoring unit 50 has the flexibility of being installed on different manhole covers with different cavity 16/rib 17 configuration on the underside of the cover. Preferably, the through-hole 15 is formed in a region with sufficient cavity 16 space on the underside 13 of the manhole cover (depending on the position of the ribs 17 or other structures on the manhole cover).

In the preferred configurations, the through-hole 15 (and consequently the connection 21) is a generally central connection. The generally central connection 21 is located at the centre or towards the centre of the device and/or manhole cover body 10. In other configurations the connection may be off-centre.

As the hollow connection shaft 23 is inserted/passes through the through-hole 15 of the manhole cover body 10, the antenna unit 20 rests against the top surface 11 of the cover. The antenna unit base plate 22 is a flat structure providing a large bearing surface for engaging the top surface of the cover and provide a stable connection between the device and the cover once the antenna unit is secured to the cover (e.g. with a nut tightened on the underside of the cover).

Figure 5:
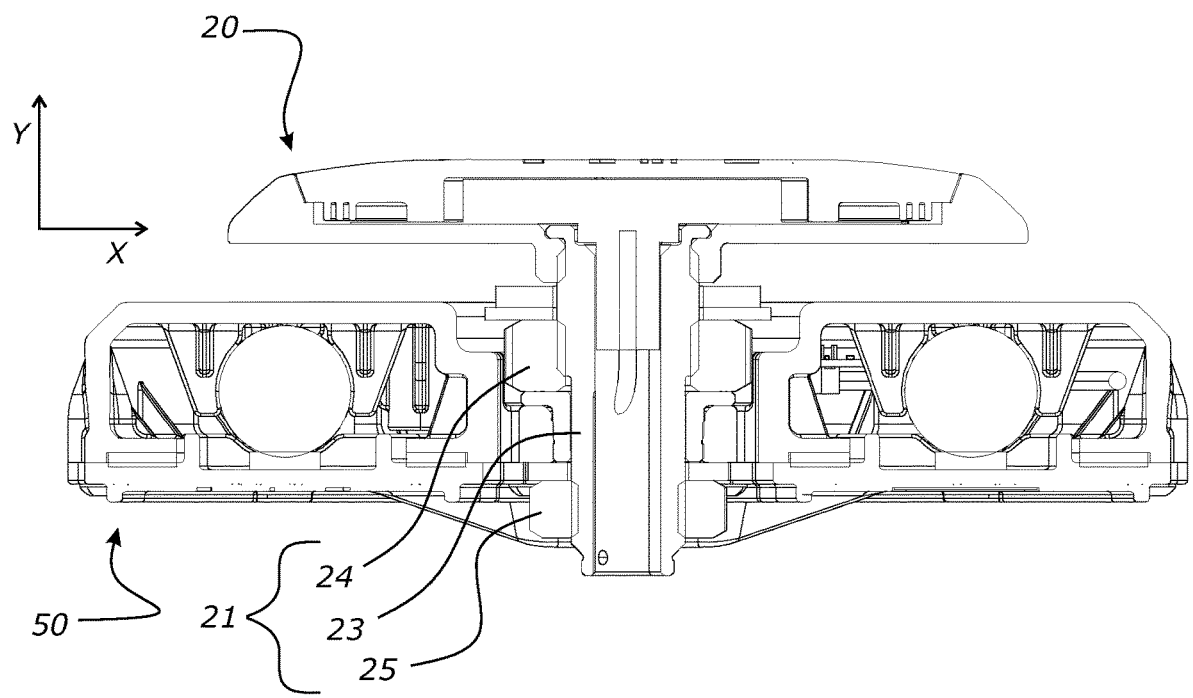
FIG. 5 shows a cross section of the remote sensing device along line AA of FIG. 2.

The hollow connection shaft 23 is an elongate shaft structure generally extending along the longitudinal axis (Y) of the remote sensing device as shown in FIG. 5. The elongate shaft structure extends along a longitudinal connection axis (C) passing through the through-hole 15, as shown in FIG. 11.

Preferably, the hollow connection shaft 23 is a rigid structure formed from durable material such as metal (stainless steel/ferrous material) or other suitable material known to a person skilled in the art.

Most preferably, the hollow connection shaft 23 is a threaded structure (comprises an external thread). The hollow connection shaft 23 is at least partially threaded to receive and secure the units 20, 50 with a securing element (e.g. large securing nut).

In the preferred configurations, the connection 21 is the primary/main connection for securing the device onto the manhole cover 10. The connection 21 formed between the antenna unit 20 and the monitoring unit 50 rigidly connects the device 100 with the manhole cover body 10 without any or with limited modification (formation of a through-hole) to traditional manhole covers. This can allow simple, quick and cost-efficient installation of the device 100, even on-site at the manhole on the side of the road.

Preferably, the hollow connection shaft 23 depends from a lower surface of the base plate 22 of the antenna unit 20, as shown in FIG. 6.

In some configurations, the hollow connection shaft 23 is connected to the antenna unit 20. The antenna unit 20 and the connection shaft 23 can be rigidly coupled/locked together e.g. using fasteners (countersunk screws), mating features (e.g. threaded components) or other locking engagement features known to a person skilled in the art.

In other configurations, the hollow connection shaft 23 is integrally formed with the antenna unit 20 (i.e. formed as one piece).

In one configuration, the connection 21 comprises one or more securing elements/nuts 24, 25 for securing the antenna unit 20 and/or monitoring unit 50 to a structure of an infrastructure being monitored (e.g. to the manhole cover as shown in FIG. 10, catch pit grate as shown in FIG. 16, pipe of a raingarden as shown in FIG. 17, or a structure on a trough, tank etc.).

After the hollow connection shaft 23 has been inserted through the manhole cover, preferably, a primary antenna fastener 24, inserted from the underside of the manhole cover, secures the antenna unit 20 to the cover body 10 (i.e. as the fastener is tightened, the antenna unit 20 is tightened against the top surface 11 of the cover.) The primary antenna fastener 24 provides a stable connection for securing the antenna unit 20 to the manhole cover after it has been aligned/been calibrated to its desired operating position.

Preferably, after the antenna unit 20 has been secured to the manhole cover, the monitoring unit 50 is secured to the hollow connection shaft. In one configuration, a primary unit fastener 25 is inserted from the underside of the manhole cover to provide a rigid connection as it secures the monitoring unit 50 to the cover body 10 (i.e. as the fastener is tightened, the monitoring unit 50 is tightened upwards towards/against the bottom surface 12 of the cover.) As the primary unit fastener 25 is tightened the unit is clamped/sandwiched between the manhole cover (above the unit) and primary unit fastener 25 (below the unit).

In one configuration, the connection assembly 21 comprises a double fastener stack (i.e. including both the primary antenna fastener 24 and the primary unit fastener 25) to connect both the antenna unit 20 and the monitoring unit 50 to the manhole cover body 10.

In the preferred configurations, the antenna unit 20 is secured to the manhole cover body 10 before the monitoring unit 50 is secured to the manhole cover body with a fastener. Securing the antenna unit 20 before securing the monitoring unit 50 can improve the ease of installation.

Further, using separate fasteners 23, 24 for securing each of the units 20, 50 can improve the ease and accuracy of positioning the units 20, 50. One or both of the antenna unit 20 and monitoring unit 50 are free to rotate as desired to their operating position (e.g. the monitoring unit 50 can be position for the sensor to best detect the parameter) before securing the unit using the fastener.

In the preferred configurations, the primary connection fasteners 23, 24 used to secure the units 20, 50 to the hollow connection shaft 23 are nuts. The dimensions of the nut are preferably sufficiently large to secure the antenna unit 20/monitoring unit 50 tight against/towards the cover body 10 (e.g. nuts having a M16 and/or M20 thread may be used). The securing nut preferably comprises a sufficient large engaging surface to secure against the monitoring unit 50 and/or cover body (component of infrastructure) to secure the units to form a rigid/robust connection.

In other configurations, other suitable fasteners known to a person skilled in the art may be used. Alternatively, other securing elements/techniques such as threading the units directly to the manhole cover or welding the unit(s) to the manhole cover may be used. In some configurations, an external thread of the hollow connection shaft engages directly with the component of infrastructure. For example, the threaded shaft is installed into a threaded recess in a manhole cover.

In some configurations, the connection assembly 21 further comprises components to improve the connection performance.

In the preferred configurations, the connection 21 further comprises washers or gaskets (e.g. anti-vibration washers) or plates 26 to evenly distribute the load of the fastener connection and/or reduce loosening of the connection due to vibrations. In some configurations, one of the plates 26 is an upper plate extending radially from a central hub 55 (further than typical washers) to improve reduce transfer of vibrations, space the monitoring unit 50 from the bottom surface 12 of the manhole cover 10 and/or accommodate other mounting elements.

In some configurations, the connection 21 further comprises an anti-crush element between the primary connection fasteners 23, 24, to limit how far the primary unit fastener 24 can press against the monitoring unit 50 (to reduce the likelihood of damaging the housing due to over tightening).

In some configurations, the remote sensing device comprises a secondary connection to connect the monitoring unit 50 to the central connection 21 (not shown). The secondary connection can supplement the primary connection 21.

The secondary connection may be a threaded, snap-on, twist-fit, bayonet mount (FIG. 14) or similar connection between the monitoring unit 50 and the hollow connection shaft 23 and/or the manhole cover body 10.

Optionally, this secondary connection is less rigid in comparison to the primary connection discussed above. In some configurations, the secondary connection is compliant.

The remote sensing device 100 comprises a cable connection 40 for connecting the antenna unit 20 and the monitoring unit 50 to provide electrical, data and/or power communication between the units. In some configurations, the cable connection 40 is suitable for RF signal use (e.g. RG316 coaxial cable/MMCX connector may be used).

In some configurations, flexible or rigid cables may be used to connect the units together.

Preferably, the cable connection 40 to the antenna unit 20 is potted to avoid disconnection due to vibration.

Figure 3:
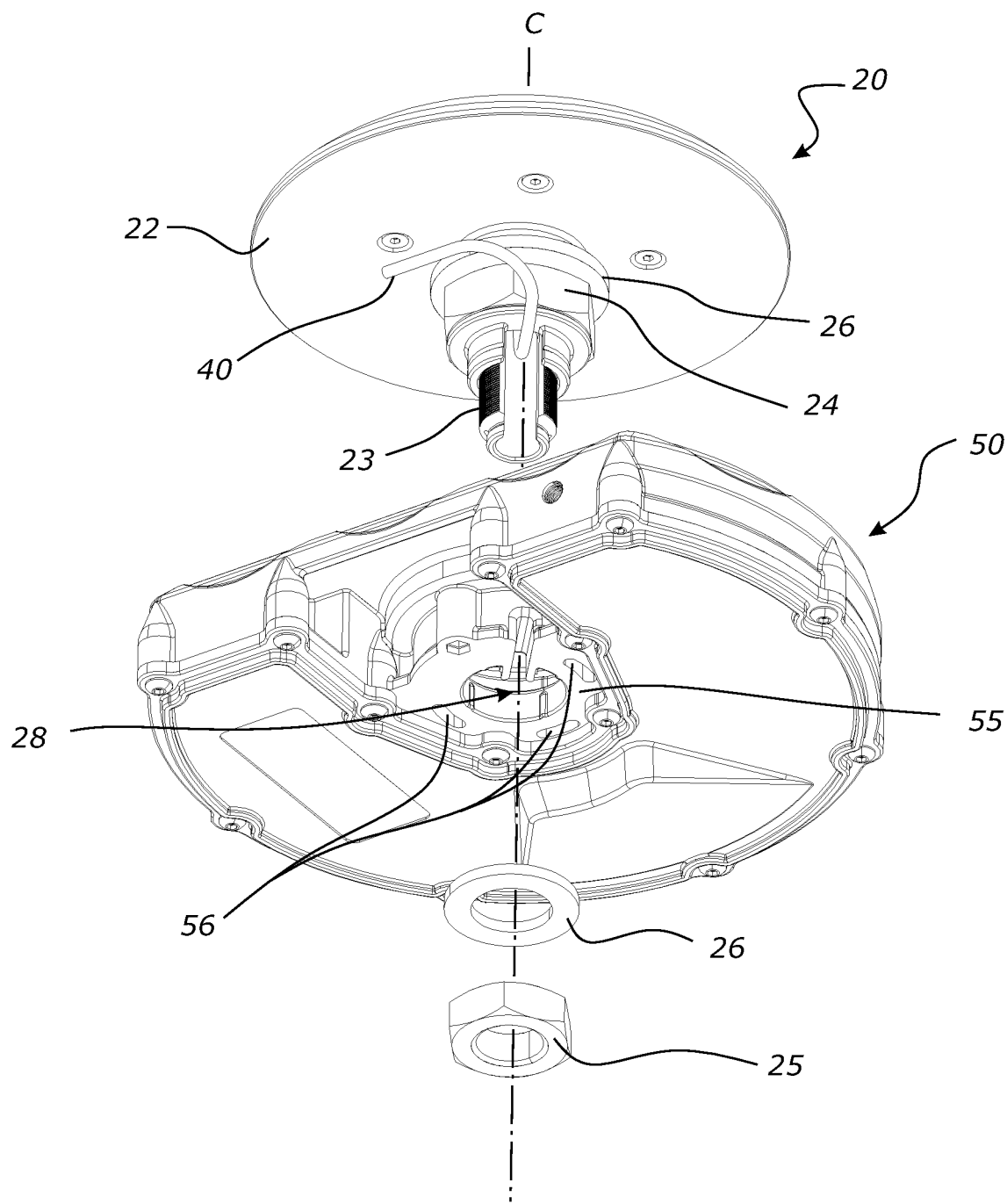
FIG. 3 shows an exploded view of the remote sensing device.
Figure 4:
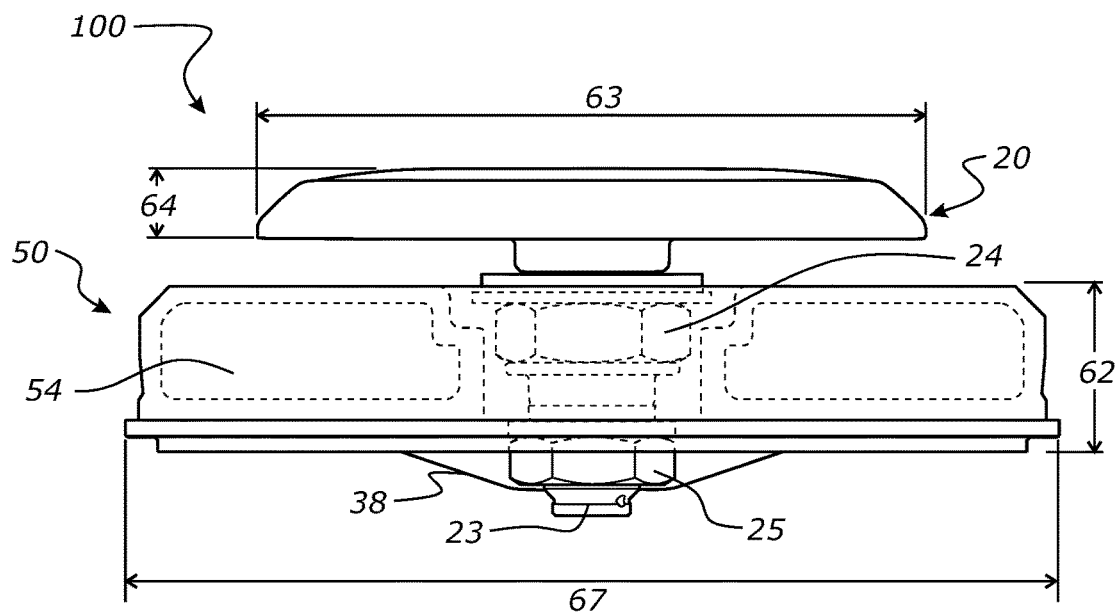
FIG. 4 shows a side view of the remote sensing device.

Preferably, the cable connection 40 passes through the hollow connection shaft 23, as shown in FIGS. 3 and 6. The cable connection 40 is protected by the hollow connection shaft sleeve 23 and the cable is guided from the antenna unit 20 towards a connection point on the monitoring unit 50.

In some configurations, the hollow connection shaft 23 comprises a side cut-out 28. The side cut-out is configured to allow the cable connection 40 to exit the connection 23 laterally and connect with the monitoring unit 50. The cable connection exits substantially laterally so that the cable is able to connect to the monitoring unit 50, located adjacent/to a side/laterally of the hollow connection shaft.

It should be appreciated, the side cut-out 28 can help provide a simple to connect, and low-profile connection from the hollow connection shaft 23 and the monitoring unit 50 located radially outwards from the central hub 55.

The side cut-out 28 can also be used as a positioning feature as the appropriate monitoring unit 50 position relative to the antenna unit 20 can be guided by the side-cut out for the cable connection 40.

In other configurations, the antenna unit 20 and monitoring unit 50 comprises component-to-component pin connectors, i.e. not requiring a separate/external cable to connect components.

In some preferred configurations, components of the antenna unit 20 and the monitoring unit 50 connection are coaxially aligned to simplify connection between the antenna unit and the monitoring unit. Preferably, the central connectors are coaxially aligned with the through-hole 15 of the manhole cover. Simplifying connections can reduce the time of installation of the components as so they can be efficiently retrofitted to an existing manhole cover or installed onto the manhole cover during manufacture.

As the antenna unit 20 and monitoring unit 50 are separate and individually watertight units, a physical and electrical connection need to be made between the units. A physical connection supports the monitoring unit 50 and connect it to the antenna unit 20 (to form a rigid connection and resist impact and vibrations due to pedestrians and vehicles passing above). Preferably, as mechanical coupling is formed, the connection is physically so that the units are electrically linked, power and/or information can flow between the components of the smart manhole cover.

Figure 15:
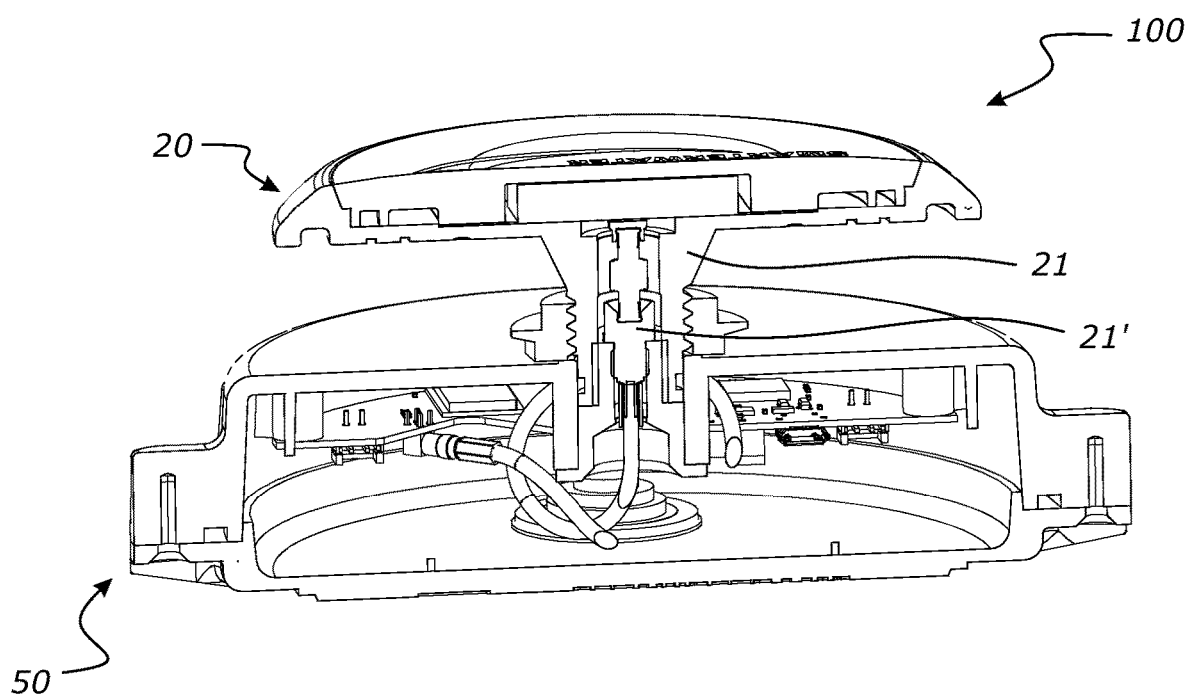
FIG. 15 shows another smart manhole cover embodiment having a quick connect coaxial connection.

In some configurations, all necessary electrical connections are made by simply fitting/connecting the antenna unit 20 and the monitoring unit 50 together. As the mechanical connection(s) between the units 20, 50 is established, an electrical connection is formed between the antenna unit and monitoring unit at the same time. The electrical connection and the mechanical connection are formed in one motion to connect the antenna unit and monitoring unit (e.g. both a physical and electrical connection is formed when monitoring unit is pressed and/or twisted onto the antenna unit) as shown in FIG. 15.

Preferably, the electrical connection 21' between the units is supported by (e.g. buried inside) the structural connection 21 between the units.

Figure 14:
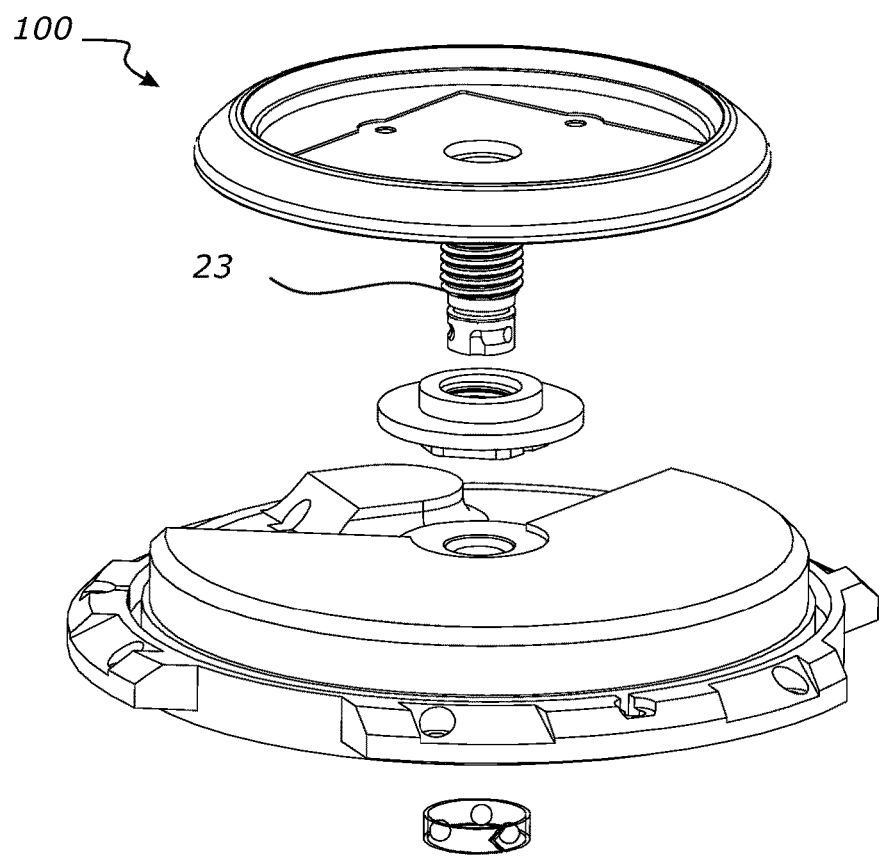
FIG. 14 shows another smart manhole cover embodiment having a bayonet connection.

In some configurations, the antenna unit 20 and the monitoring unit 50 are connected by one or a combination of push-and-twist, press, snap, twist-fit, magnetic, bayonet mount (as shown in FIG. 14) or similar connections. A manual connection of a separate cable connection 40 is not required, as aligning and physically connecting the antenna unit 20 and the monitoring unit 50 simultaneously forms the electrically, power and/or information connection.

Components Surrounding Hollow Connection Shaft

As previously described, a typical manhole cover has limited space on the underside of the cover (due to a limited cavity height 16 and obstructions e.g. ribs 17). Efficient use of the limited space to provide a low-profile and robust device, while also having the desired monitoring/communication performance requirements is desirable.

A low-profile device integrated with the manhole cover can provide a simple smart manhole cover 1, as all the components are connected to the cover (i.e. monitoring unit/sensor does not need to be installed down inside the manhole e.g. on the manhole wall). Further, the monitoring unit 50 on the underside will not be damaged when the manhole cover is dragged or placed on the ground.

Figure 7:
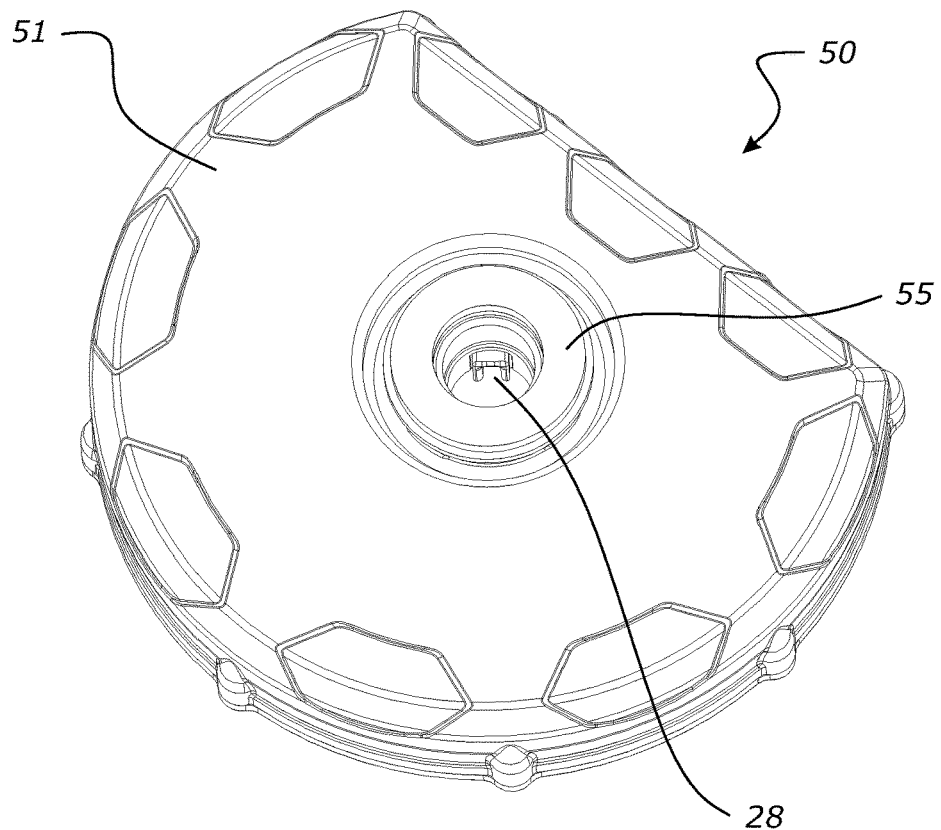
FIG. 7 shows a perspective view of a monitoring unit.

In the preferred configurations, the monitoring unit 50 comprises an opening 28 for receiving the hollow connection shaft 23 as best shown in FIGS. 3 and 7. Most preferably, the opening 28 allows the hollow connection shaft 23 to pass completely through the housing 51 of the monitoring unit 50. The electrical components being housed within the water-tight/sealed monitoring unit 50 surrounding the opening 28 and hollow connection shaft 23 when assembled to protect internal components.

It should be appreciated the monitoring unit 50 with an opening 28 can work in synergy with the elongate connection shaft 23 feature to provide a low-profile remote sensing device 100 while also providing a strong/robust connection between the units and to attach the monitoring unit 50 to the manhole cover itself.

Figure 8:
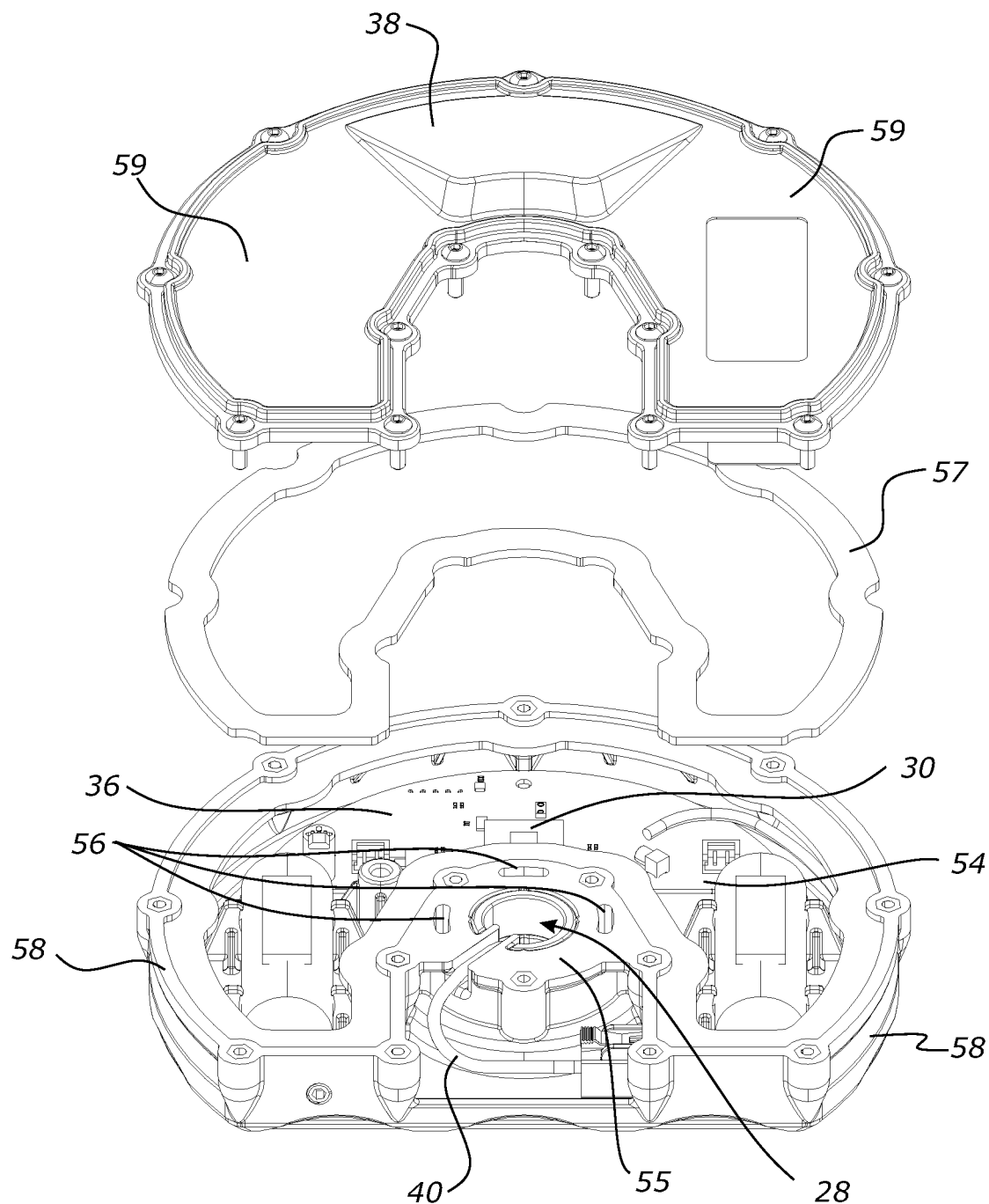
FIG. 8 shows an exploded view of the monitoring unit.

Preferably, the electrical components are located in a cavity 54 of the monitoring unit, arranged to be spaced radially around the opening as shown in FIG. 8.

In the preferred configurations, the monitoring unit 50 comprises a hub 55, the hub for mounting the elongate shaft. The hub 55 being a region of the monitoring unit surrounding the opening. Preferably, the hub 55 is isolated from the cavity (i.e. it is a region which does not house the electrical component). Preferably, the hub 55 is formed at or towards an inner perimeter of the monitoring unit 50 (around the opening 28).

In these configurations, preferably all the electrical components on the underside 13 of the manhole cover 10 are housed in the monitoring unit 50 such that they are arranged to be spaced radially around the longitudinal connection axis (C) passing through the through-hole 15 of the manhole cover body 10 as shown in FIGS. 3 and 11.

The opening 28 is aligned with the longitudinal connection axis (C) passing through the through-hole so that the connection 21 can pass through the opening. Preferably, the opening 28 is located generally centrally relative to the manhole cover body 10. In other configurations, the opening 28 may be off-center.

The monitoring unit 50 may comprise one of the following housing profiles: a donut, ring, partial-ring, horseshoe or similar profile with an opening, when viewed in plan view. It should be appreciated the monitoring unit 50 can have other profiles (e.g. circular, semi-circular, square, rectangular, triangular, bean, peanut shaped etc.) with an opening 28.

In plan view, the monitoring unit 50 and the electrical components it houses are not present in the region of the opening 28. No active components are located in the opening region 28, so that the hollow connection shaft/hub 28 can pass through the monitoring unit.

A low-profile can be achieved as the electrical components are spaced radially outwards from the hollow connection shaft 23 to use the space surrounding the connection to minimise the height of the device.

In these configurations, the monitoring unit 50 (and the electrical components it houses) has a low-profile and are located in a region between the top and bottom ends of the hollow connection shaft 23. The monitoring unit 50 does not increase the height of the remote sensing device. The monitoring unit 50 is not located below the bottom end of the hollow connection shaft 23.

A robust connection can be formed as the hollow connection shaft 23 passes through the opening 28 of the monitoring unit and a hub fastener (e.g. a securing nut) can be used to tightened the fastener against the monitoring unit 50.

Further, the opening 28 of the monitoring unit 50 preferably provides a drainage pathway for water to prevent pooling on the housing (and to pass through the monitoring unit). Drainage pathways can direct water away from connection points or other potential regions of entry into the housing 51. It should be appreciated the remote sensing device 100 operates in an environment where a lot of water can be present (e.g. due to rain and/or vapour or condensation build up). Consequently, potential leak pathways into the unit should be eliminated or minimised.

Preferably, the monitoring unit comprises one or more drain ports 56. The drain ports being located on the hub 55 for water to pass through the monitoring unit 50, without entering the cavity 54 housing the electrical components as best shown in FIG. 8. In some configurations, the drain ports 56 are located on an upper housing portion 58 of the monitoring unit 50. The drain ports 56 are spaced radially around the hollow connection shaft 23/opening 28. The drain ports 56 can form part of the drainage pathway for water to exit from a top side of the monitoring unit to a bottom side without pooling.

The opening 28 provides a drainage pathway, as water which enters from the manhole cover can flow around the antenna unit 20, and downwards through the monitoring unit 50 (and out through the drain ports 56) due to gravity. This reduces the likelihood of water leakage into the monitoring unit 50 as a connection point is not located on the top surface of the unit, and pooling on top of the monitoring unit is minimised.

Preferably, the opening 28 provides the primary drainage pathway for water to pass/exit through the monitoring unit 50.

In some configurations, the opening 28 comprises a width/diameter greater than the hollow connection shaft 23 diameter. The opening 28 provides a pathway for water to flow around the hollow connection shaft 23.

Monitoring Device Housing and Water Tightness

In some configurations, the monitoring unit 50 housing 51 comprises an upper housing portion 58 and a lower housing portion 59, as best shown in FIG. 8. The housing portions 58, 59 are secured together to form an independent watertight housing connectable to the antenna unit 20.

Preferably, the upper housing portion 58 has downwards facing shell profile to protect the electrical components of the monitoring device 50. In these configurations, the lower housing portion 59 can be a substantially flat housing portion/a lid for closing the housing. The upper housing portion 58 and the lower housing portion 59 can be connected together with a plurality of fasteners (e.g. socket screws).

Preferably, the sealing surface between the upper housing portion 58 and the lower housing portion 59 is located on an underside of the monitoring unit to reduce the likelihood of ingress of water.

Gaskets 57 (shown in FIG. 8) can be used to mechanically seal the space between the mating surface between the housing portions 58, 59 and to minimise the likelihood of leakage into the monitoring unit 50. Suitable gaskets known to a person skilled in the art may be used such as compression gaskets, neoprene gaskets, foam or liquid gaskets, RTV silicone/rubber gaskets etc.

In some configurations, a single gasket is provided between the upper housing portion 58 and the lower housing portion 59 to seal the mating surface between the housing portions. This is possible with certain monitoring unit profiles, such as in configurations where the monitoring unit has a horseshoe/partial ring profile.

Preferably, the monitoring units 50 are formed from polymers and additives/engineered plastics to suitable for enduring the environment of a manhole. It is anticipated that the monitoring units 50 can be formed from other materials or a combination of materials known by a person skilled in the art to be suitable for the environment the remote sensing device 100 will be in.

Details of Electrical Components

Figure 13:
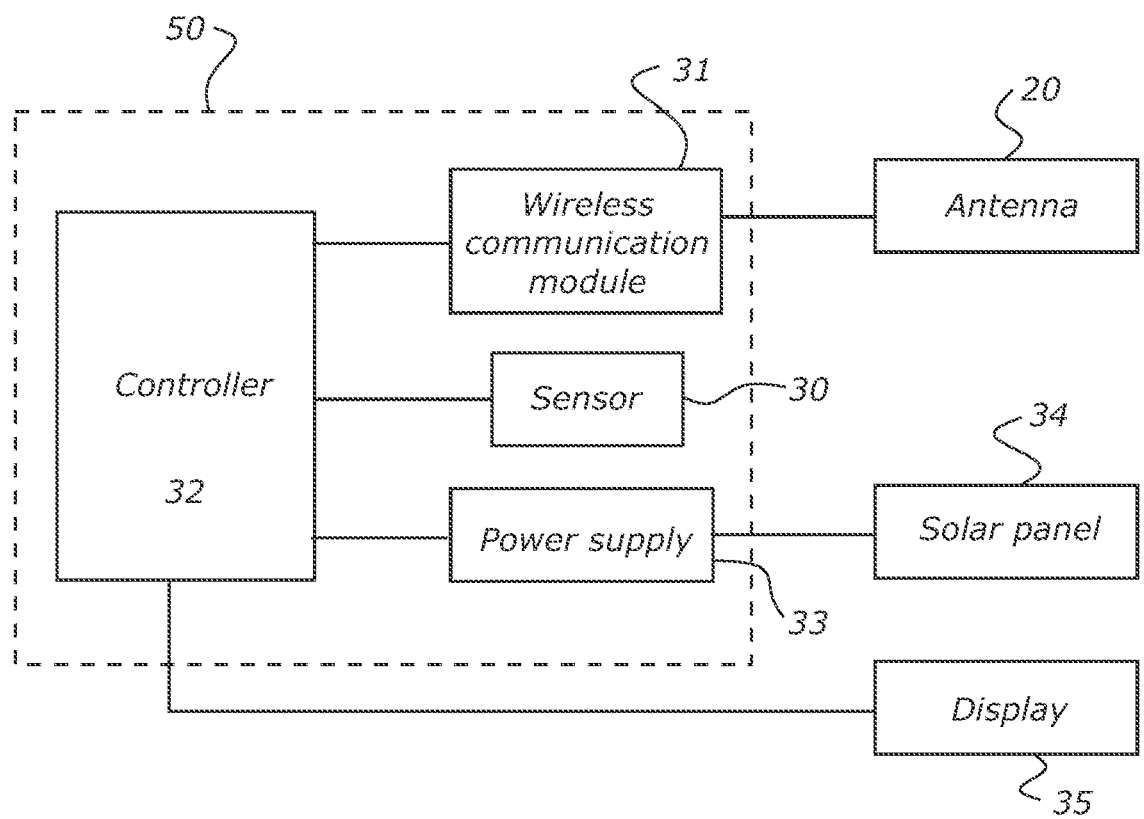
FIG. 13 shows a simplified diagram of components of the remote sensing device.

A simplified diagram of a preferred configuration showing possible components of the remote sensing device 100, some of which are housed within the monitoring unit 50, is shown in FIG. 13.

In the preferred configurations, the remote sensing device 100 comprises a sensor 30 for detecting a parameter. The sensor 30 is one of the electrical components housed within the monitoring unit 50.

In the preferred configurations, the remote sensing device 100 comprises a wireless communication module 31 located within the monitoring unit 50. The wireless communication module 31 comprises a wireless transmitter and/or wireless receiver connected to the antenna.

The antenna preferably transmits information obtained by the sensor 30 to a remote receiver. For example, data from the device can be transmitted to a mobile phone, tablet or computer. Preferably, the device uses low-power wide-area network technologies (LPWAN). Optionally dedicated gateways can be used if necessary.

In the preferred configurations, the remote sensing device 100 comprises a controller 32 connected to the sensor 30 and wireless communication module 31.

In the preferred configurations, the electrical components are connected on a PCB board 36.

Optionally, the remote sensing device 100 comprises supplementary components such as a solar panel 34 or display 35 for displaying information from the device.

The sensor 30 is configured to detect a parameter associated with the manhole, manhole cover or other water infrastructure and/or their environment. The sensor 30 eliminates or at least reduces the frequency required for operators to check and/or access the manhole.

In some configurations, the sensor 30 is one of the follow types of sensors:
a) water level sensor;
b) non-contact flow sensor;
c) gas sensor;
d) temperature sensor;
e) moisture sensor;
f) tamper sensor;
g) vibration sensor; or
h) light sensor.

It is anticipated that in other configurations, other sensors types known to a person skilled in the art may be provided in the remote sensing device 100 for detecting other parameters as required.

In the preferred configurations, the sensor(s) is located within the monitoring unit 50 and the sensor does not protrude out of the housing 51.

In contrast, a sensor or probe which extends or hangs below the manhole cover body 10, into the manhole cavity may be unfavourable as the cover is not as compact/low-profile, and the sensor/probe may be damaged when the manhole cover 1 is being installed/moved/dragged. Furthermore, sensor(s) integrated with the manhole prevents a person from needing to enter the manhole to install/maintain/replace the sensor.

In the preferred configurations, the sensor 30 is a radar sensor for monitoring water level. The radar sensor emits electromagnetic waves to monitor water level in the manhole. It should be appreciated, a radar sensor can provide advantages in a manhole/water infrastructure application as it can provide consistent, accurate readings (as it is not affected by disruptions such as wind or airflow) and uses low power. The radar sensor can also interpret different interface layers in the measurement environment. Therefore, the radar sensor can see through/identify different media including dust, wood, leaves, oil, foam on water.

Figure 9:
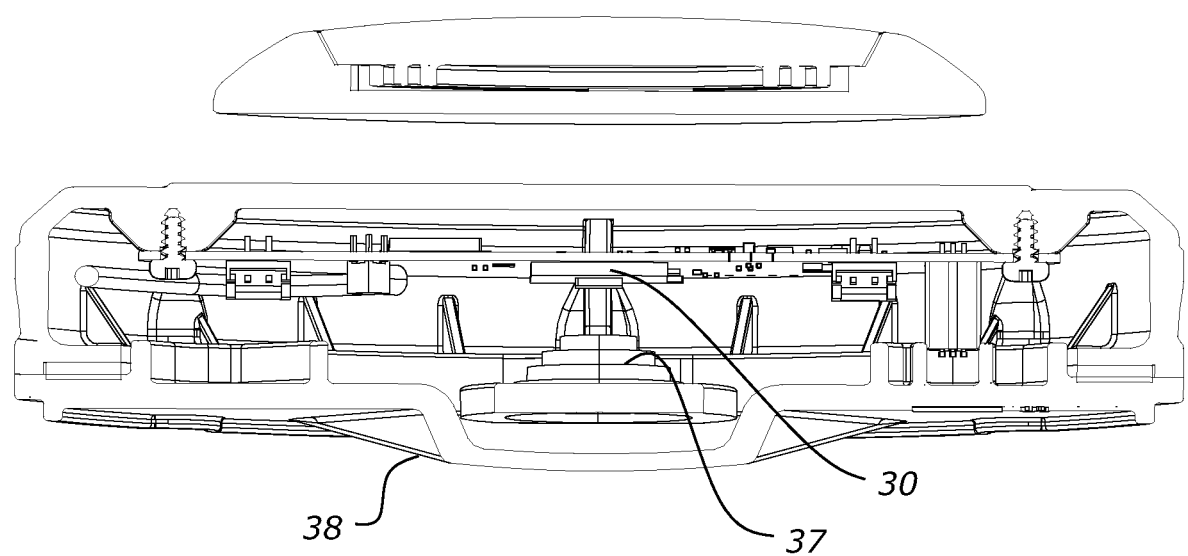
FIG. 9 shows a cross section of the remote sensing device along line BB of FIG. 2.

The radar sensor 30 comprises a lens 35 (e.g. a Fresnel lens) as shown in FIG. 9. In the preferred configurations, the lens 35 is integrated with the housing of the monitoring unit 50 (preferably, integrated with the lower housing portion/lid 59). The lens focal length may be adjusted as required by changing the lid 59.

It should be appreciated integration of the lens 35 with the monitoring unit housing 51 can provide advantages such as reducing potential leak pathways and/or water ingress failure points, providing a low-profile/compact device, reduces production costs and complexity compared to a lens manufactured as part of the PCB or otherwise, and also allowing for simple lens replacement for different applications.

In the preferred configurations, the monitoring unit 50 comprises a water rejecting region 36. The water rejecting region 36 is preferably on the housing 51 of the monitoring unit, in a focal area of the lens 35 as shown in FIG. 9.

Figure 2:
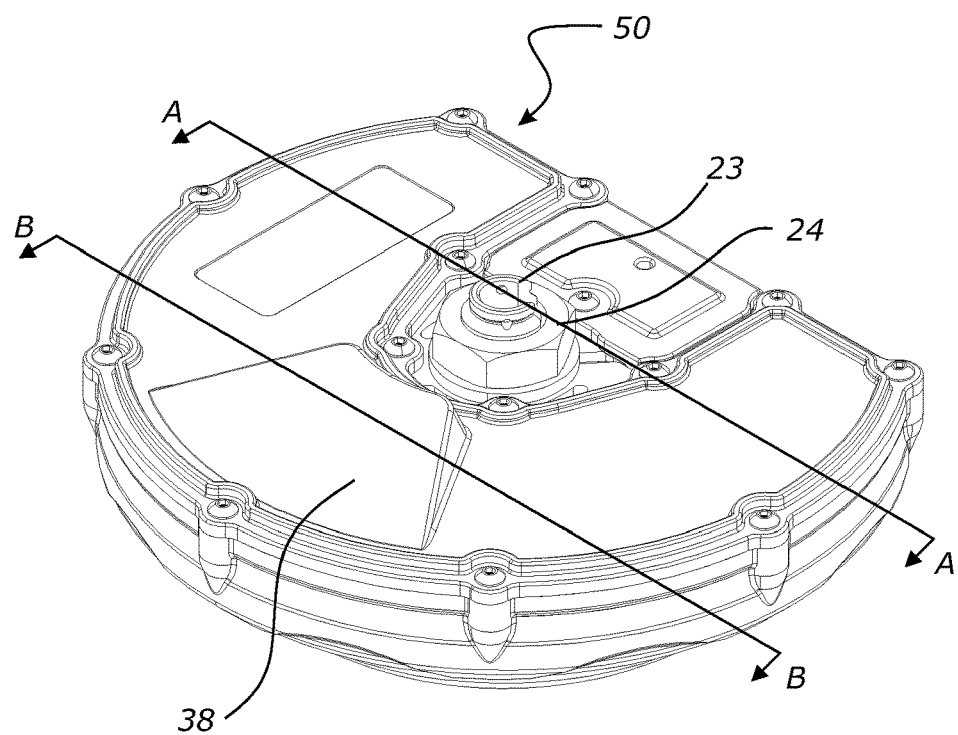
FIG. 2 shows a bottom perspective view of the remote sensing device.

In some configurations, the water rejecting region 36 is a ramp on the housing surface for draining water away from the focal area/lens view of the radar sensor 30 as best shown in FIGS. 2 and 8. The ramp 36 drains downwards and away from the focal area/view of the lens due to gravity. In the pictured configuration, the ramp 36 drains downwardly and inwardly towards the opening 28. In other configurations, the ramp 36 drains downwardly and outwardly away from the opening 28

Stagnate water/moisture due to rain or vapour on the housing in the focal area of the radar sensor is undesirable as it can cause interference with the signal and prevent radar from seeing various interface zones.

Optionally, the ramp/water rejecting region 36 comprises a hydrophobic coating or other features or coatings to promote water to move away from the focal area of the sensor.

Dimensions

It is anticipated that components of the remote sensing device 100 are sized and profiled as required for different manhole covers and/or different environments and situations. A range of suitable dimensions for some configurations for the components/structures of the remote sensing device 100 will now be provided, with referenced to FIGS. 4 and 6.

In the preferred configurations the monitoring unit (50) comprises a width/diameter (61) between 50 mm and 200 mm.

Most preferably, the monitoring unit (50) comprises a width/diameter (61) between 50 mm and 160 mm.

In the preferred configurations the monitoring unit (50) comprises a height (62) between 25 mm and 60 mm.

Most preferably, the monitoring unit (50) comprises a height (62) between 30 mm and 40 mm.

Preferably, the monitoring unit (50) comprises a height less than the height of the cavity (16) on the underside (13) of the manhole cover body, so the manhole cover can rest on the ground/dragged without damaging the monitoring unit.

In the preferred configurations the antenna unit (20) comprises a width/diameter (63) between 50 mm and 160 mm.

Most preferably, the antenna unit (20) comprises a width/diameter (63) between 50 mm and 120 mm.

Preferably, the antenna unit 20 comprises a surface area big enough to receive the antenna wire and provide a good signal to communicate information to/from the smart manhole cover 1.

In the preferred configurations the antenna unit (20) comprises a height (64) between 5 mm and 20 mm.

Most preferably, the antenna unit (20) comprises a height (64) between 5 mm and 15 mm.

Preferably, the antenna unit 20 comprises a flat profile so that it does not act as a hazard to vehicles or people above the manhole cover 1.

In the preferred configurations the hollow connection shaft (21) has a height (65) between 15 mm and 60 mm.

Most preferably, the hollow connection shaft (21) has a height (26) between 15 mm and 40 mm.

Preferably, one or more of the connectors associated and/or within the monitoring unit 50 are horizontally arranged such that they are generally aligned with the horizontal plane of the manhole cover. Connectors in this orientation helps form a compact/low-profile cover Modular Units In some configurations, the electrical components are housed within two or more separate modular monitoring units 50 (FIG. 12). Preferably, the one or more modular monitoring units 50 are removably coupled on the underside 13 of the cover body 10.

Preferably, in these configurations, as multiple modular monitoring units 50, 50', 50" are physically connected, they become electrically linked, so that power and/or information can flow between the modular monitoring units. The electrical contacts 53 of neighbouring modular units are formed and broken, as the modular units are physically connected and disconnected from each other.

In the most preferred configurations, the modular units 50 are removably connected together. Removably connected modular units 50 may be advantageous as the modular units can be easily installed or removed for maintenance/repair or for providing and removing certain functionality as required.

Preferably, neighbouring modular units comprise complementary features for connecting the modular units together. In some configurations, the neighbouring modular units are connected together by one or a combination of the following connection types: threaded, plug-fit, magnetic, bayonet mount connections. It is anticipated other suitable connection features may be used to connect neighbouring modular units.

In these configurations, preferably the connectors are of a type such as spring-loaded or sliding connectors that aid in aligning the electrical contacts 53 between the modular units 50, 50'.

In some configurations, two or more of the modular units are connected laterally, so that the units are located within the cavity 16 on the underside of the manhole cover and to maintain a low-profile device.

In other configurations two or more of the modular units are connected in series in a vertical stack. In these configurations, preferably a bottom surface of an upper modular unit 50 is configured to engage with a top surface of a lower modular unit 50'.

In the preferred configurations, at least two of the modular units house components of different types to provide different functions for the smart manhole cover.

For example, in one configuration, a first modular unit 50 houses a first sensor 30 to detect a first parameter, and a second modular unit 50' houses a second sensor 30' to detect a second parameter. In one configuration, the first modular unit 50 houses a tamper sensor to detect whether the manhole cover 1 has moved, and the second modular unit 50' houses a water level sensor to detect the water level within the manhole.

In other configurations, two or more of the modular units comprise components of the same type to augment a function. For example, in one configuration, the smart manhole cover 1 comprises two power supplies. Each power supply 33 is housed in a separate modular unit 50, 50'.

It is anticipated that supplementary modular units may be connected to the smart manhole cover 1 to increase the different types of functions available or augment the functions of the smart manhole cover as desired.

To those skilled in the art to which the invention relates, many changes in construction and widely differing embodiments and applications of the invention will suggest themselves without departing from the scope of the invention as defined in the appended claims.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A remote sensing device for monitoring a condition within a water infrastructure network comprising:
    an antenna unit configured to be located at or towards a top surface of a water infrastructure component in the water infrastructure network, the antenna comprises a flat base for engaging with the top surface of the water infrastructure component, the antenna unit having an elongate connection shaft comprising a hollow depending therefrom, the elongate connection shaft providing a mounting structure on the underside of the water infrastructure component for receiving and supporting a structure;
    a monitoring unit for housing electrical components including a sensor for detecting a parameter, the monitoring unit removably mounted to the antenna;
    wherein the monitoring unit comprises a hub for mounting the monitoring unit to the elongate connection shaft, the hub being a region of the monitoring unit surrounding an opening of the monitoring unit, the opening configured such that the elongate connection shaft passes completely through the housing of the monitoring unit;
    wherein the electrical components are located in a cavity of the monitoring unit, arranged to be spaced radially around the hub and the monitoring unit is located in a region between the top and bottom ends of the elongate connection shaft; and
    wherein the antenna unit and monitoring unit are separate and individually water-tight structures.

2. The remote sensing device as claimed in claim 1 wherein the elongate connection shaft comprises an external thread for making an essentially rigid connection, and further comprises a nut associated with the threaded elongate connection shaft, the nut having a large engaging surface for engaging against the water infrastructure component, to form the essentially rigid connection.

3. The remote sensing device as claimed in claim 1 wherein the elongate connection shaft is connected directly to the water infrastructure component to form an essentially rigid connection, and
    wherein an external thread of the elongate connection shaft engages directly with the water infrastructure component.

4. The remote sensing device as claimed in claim 1 wherein an electrical connection is formed between the antenna unit and monitoring unit at the same time as a mechanical connection between the units is established with one motion, and
    wherein the electrical connection is a push type electrical connector incorporated with the elongate connection shaft.

5. The remote sensing device as claimed in claim 1 wherein the monitoring unit comprises one or more drain ports located on the hub for water to pass through the monitoring unit, without entering the cavity housing the electrical components.

6. The remote sensing device as claimed in claim 1 wherein in plan view, the monitoring unit comprises one of the following general housing profiles:
    a) donut,
    b) ring,
    c) partial-ring, or
    d) horseshoe.

7. The remote sensing device as claimed in claim 1 wherein the sensor is one of the following:
    a) water level sensor,
    b) non-contact flow sensor,
    c) gas sensor,
    d) temperature sensor,
    e) moisture sensor,
    f) tamper sensor,
    g) vibration sensor, or
    h) light sensor.

8. The remote sensing device as claimed in claim 1 wherein the sensor is a radar sensor comprising a lens, and wherein the lens is integrated with a housing of the monitoring unit, and comprises a water rejecting region in a focal area of the lens, and wherein the water rejecting region is a ramp on a housing surface of the monitoring unit for draining water downwards away from the focal area.

9. The remote sensing device as claimed in claim 1 wherein the electrical components housed in the monitoring unit comprise one or a combination of:
 a) a controller,
 b) a wireless communication module,
 c) a power supply, and
 wherein the electrical components are housed within one monitoring unit.

10. The remote sensing device as claimed in claim 1 wherein the monitoring unit comprises an upper housing portion and a lower housing portion, the upper housing portion comprises a downwards facing shell profile and the lower housing portion comprises a substantially flat lid profile, and wherein a single gasket is provided between the upper housing portion and the lower housing portion to seal a mating surface between the housing portions.

11. The remote sensing device as claimed in claim 10, wherein the water infrastructure component is a:
 a) manhole cover,
 b) grate,
 c) cap, or
 d) lid.

12. The remote sensing device as claimed in claim 1 wherein the monitoring unit is not located below the bottom end of the hollow connection shaft.

13. A smart manhole cover comprising:
 a manhole cover body; and
 a remote sensing device as claimed in claim 1;
 wherein the remote sensing device is connected to the manhole cover body such that the antenna unit is located at an upper surface of the manhole cover body and the monitoring unit is located on an underside of the manhole cover body.

14. The smart manhole cover as claimed in claim 13 wherein the elongate connection shaft passes through a through-hole of the manhole cover body for a connection between the antenna unit and monitoring unit, and wherein the elongate connection shaft extends along a longitudinal connection axis passing through the through-hole, and wherein the manhole cover body comprises a cavity on the underside of the cover for receiving the monitoring unit and the monitoring unit has a height less than the cavity height such that the monitoring unit does no protrude below a bottom surface of the manhole cover body.

15. A method of sensing a parameter comprising:
 providing a remote sensing device as claimed in claim 1;
 monitoring a parameter;
 wirelessly communicating data from the remote sensing device to a remote receiver.

16. The method of sensing a condition as claimed in claim 15 further comprising passing the elongate connection shaft through an opening of the monitoring unit and securing the monitoring unit with a hub fastener tightened against a surface of the monitoring unit.

17. The method of sensing a condition as claimed in claim 15 wherein the parameter is associated with a manhole and the remote sensing device is connected to a manhole cover body such that the antenna unit is located at an upper surface of the manhole cover body and the monitoring unit is located on an underside of the manhole cover body.

18. The method of sensing a condition as claimed in claim 15 further comprising securing the antenna unit to a manhole cover body before securing the monitoring unit.

19. The method of sensing a condition as claimed in claim 15 wherein the remote sensing device is retrofitted to an existing manhole cover body.

20. The method of sensing a condition as claimed in claim 15 wherein the remote sensing device is associated with and connected to one of the following:
 a) sewers,
 b) stormwater catch pits,
 c) rain gardens,
 d) water troughs,
 e) gross pollutant traps, or
 f) waste tanks.

* * * * *